US010356797B2

(12) United States Patent
Dimou et al.

(10) Patent No.: US 10,356,797 B2
(45) Date of Patent: Jul. 16, 2019

(54) METHODS AND APPARATUSES FOR LOWERING OVERHEAD USING CHANNEL RECIPROCITY

(71) Applicant: Telefonaktiebolaget LM Ericsson (publ), Stockholm (SE)

(72) Inventors: Konstantinos Dimou, San Francisco, CA (US); Fredrik Lindqvist, Järfälla (SE); Hugo Tullberg, Nyköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 248 days.

(21) Appl. No.: 15/105,666

(22) PCT Filed: Dec. 20, 2013

(86) PCT No.: PCT/SE2013/051600
§ 371 (c)(1),
(2) Date: Jun. 17, 2016

(87) PCT Pub. No.: WO2015/094066
PCT Pub. Date: Jun. 25, 2015

(65) Prior Publication Data
US 2017/0026979 A1    Jan. 26, 2017

(51) Int. Cl.
*H04W 24/08* (2009.01)
*H04W 52/24* (2009.01)
(Continued)

(52) U.S. Cl.
CPC ....... *H04W 72/085* (2013.01); *H04L 25/0204* (2013.01); *H04W 24/08* (2013.01);
(Continued)

(58) Field of Classification Search
CPC .............. H04L 25/0204; H04W 24/08; H04W 52/245; H04W 72/085; H04W 72/1268;
(Continued)

(56) References Cited

U.S. PATENT DOCUMENTS

2008/0014951 A1* 1/2008 Laroia ................ H04W 72/042
455/450
2009/0316661 A1* 12/2009 Tachikawa ........ H04W 36/0011
370/332
(Continued)

FOREIGN PATENT DOCUMENTS

WO    2008115699 A1    9/2008
WO    2013181823 A1   12/2013

OTHER PUBLICATIONS

Benjebbour, A. et al., "Concept and Practical Considerations of Non-orthogonal Multiple Access (NOMA) for Future Radio Access", 2013 International Symposium on Intelligent Signal Processing and Communications Systems (ISPACS), Naha, Japan, Nov. 12-15, 2013, 770-774.
(Continued)

*Primary Examiner* — Melvin C Marcelo
*Assistant Examiner* — Natali Pascual Peguero
(74) *Attorney, Agent, or Firm* — Patent Portfolio Builders, PLLC

(57) ABSTRACT

The present disclosure concerns radio communication. More particularly, the present disclosure concerns a possible reduction in overhead signaling. The radio link quality of a first radio link (e.g., DL) as well as a second radio link (e.g., UL) is obtained 130. Also, the obtained radio link quality of the first radio link is compared 140 with the obtained radio link quality of the second radio link. This is done in order to establish whether a similarity in the radio link quality is within a predefined tolerance. Next, the signaling for both the first radio link and the second radio link is controlled 150 if, or when, the similarity of the radio link quality is determined to be within said predefined tolerance.

8 Claims, 4 Drawing Sheets

(51) Int. Cl.
*H04W 72/08* (2009.01)
*H04W 72/12* (2009.01)
*H04L 25/02* (2006.01)
*H04B 17/318* (2015.01)

(52) U.S. Cl.
CPC ..... *H04W 52/245* (2013.01); *H04W 72/1268* (2013.01); *H04W 72/1273* (2013.01); *H04B 17/318* (2015.01); *Y02D 30/30* (2018.01)

(58) Field of Classification Search
CPC .. H04W 72/1273; H04B 17/318; Y02D 30/30
USPC .......................................... 370/254, 329, 332
See application file for complete search history.

(56) References Cited

U.S. PATENT DOCUMENTS

| | | | | |
|---|---|---|---|---|
| 2010/0120415 | A1* | 5/2010 | Urquhart | H01Q 1/1257 455/424 |
| 2011/0047287 | A1* | 2/2011 | Harrang | H04L 45/00 709/235 |
| 2013/0176995 | A1 | 7/2013 | Park et al. | |
| 2013/0286959 | A1 | 10/2013 | Lou et al. | |
| 2013/0322301 | A1 | 12/2013 | Ghauri et al. | |

OTHER PUBLICATIONS

Faezah, J. et al., "Adaptive Modulation for OFDM Systems", International Journal of Communication Networks and Information Security (IJCNIS), vol. 1, No. 2, Aug. 1-8, 2009.

3GPP, "3rd Generation Partnership Project; Technical Specification Group Radio Access Network; Evolved Universal Terrestrial Radio Access (E-UTRA); Base Station (BS) radio transmission and reception", 3GPP TS 36.104 V11.2.0, Sep. 2012, 1-124.

3GPP, "3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.1.0, Sep. 2012, 1-325.

Office Action issued in application No. 13899941.2, dated Mar. 28, 2018; 7 pages.

\* cited by examiner

METHODS AND APPARATUSES FOR LOWERING OVERHEAD USING CHANNEL RECIPROCITY

TECHNICAL FIELD

Embodiments presented herein generally relate to radio communication. More particularly, the embodiments presented herein relate to reducing signaling in a radio communication network. The present disclosure therefore presents methods and means (e.g. radio network apparatuses, radio network control nodes, and radio base stations) for reducing overhead signaling in radio communication networks.

BACKGROUND

Detailed descriptions of radio communication networks and systems can be found in literature, such as in Technical Specifications published by, e.g., the $3^{rd}$ Generation Partnership Project (3GPP). 3GPP Long Term Evolution (LTE) is the fourth-generation radio communication technologies standard developed within the $3^{rd}$ Generation Partnership Project (3GPP) to improve the Universal Mobile Telecommunication System (UMTS) standard to cope with future requirements in terms of improved services such as higher data rates, improved efficiency, and lowered costs. The Universal Terrestrial Radio Access Network (UTRAN) is the radio access network of a UMTS and Evolved UTRAN (E-UTRAN) is the radio access network of an LTE system. In an UTRAN and an E-UTRAN, a user equipment (UE) is wirelessly connected to a Radio Base Station (RBS) commonly referred to as a NodeB (NB) in UMTS, and as an evolved NodeB (eNodeB or eNB) in LTE. An RBS is a general term for a radio network node capable of transmitting radio signals to a UE and receiving signals transmitted by a UE.

In future generations of radio communication networks, it is foreseen that the number of radio nodes (e.g., RBS:es, radio gateways, relay nodes, etcetera) will increase significantly. Thus, the density of radio nodes will increase. Furthermore, a potentially large number of Machine Type Communication (MTC) devices such as wireless sensors will be introduced. These wireless sensors and similar devices are expected to communicate with the Core Network (CN) via radio nodes. With the introduction of MTC devices in radio communication networks, the potentially large number of MTC devices and the nature of MTC may pose new challenges on the radio communication networks. For example, this new type of communication will have to co-exist with the "classical" communication between UEs (such as mobile phones and tablet computers) and the radio communication network. In such scenario, where the density of not only radio nodes, but also UEs and MTC devices is denser (or much denser) than in previous generations of radio communication networks it will evidently become important that the communication in the radio interface is efficient.

SUMMARY

The inventors have realized that future generations of radio communication networks will mean new requirements. As mentioned in the background, the number of radio nodes and other communicating devices (e.g., UEs and MTC devices) will increase. The higher density of radio nodes and communicating devices will pose new challenges on the radio communication network. For example, in these radio communication networks with comparatively higher density of radio nodes and communication devices a number of conditions that are present in the "classical" radio communication networks may not be valid any longer. As one mere example, in some of today's radio communication networks (at least in rural and suburban areas), UEs typically communicate with macro base stations (e.g. located at roofs of high buildings). In this "classical" radio communication network, the radio propagation conditions are different for the downlinks (DL) and the uplinks (UL), e.g. due to different diffractions, refractions and/or scattering experienced. However, the inventors have realized that, in the comparatively denser radio communication networks, it is anticipated that UEs or MTC devices (e.g. wireless sensors) will communicate with radio nodes having similar characteristics as themselves. In this regard, the inventors have realized that the DL and UL link characteristics between the radio nodes and the communicating devices are likely to be similar (or even same). To mention a few examples: the antennas are probably located at roughly the same height, and the processing capabilities of the receivers as well as transmitted power levels are likely to be similar between various radio nodes and communicating devices. This would typically result in that the DL and UL links exhibit similar radio link properties, or radio link characteristics. In such case, one could say that there exists a radio link similarity between the DL and UL radio links. This radio link similarity may alternatively referred to as radio link symmetry. This radio link similarity will generally originate from the similar characteristics of the communicating devices as well as similar radio propagation characteristics in terms of e.g. signal diffraction and/or refraction. In contrast, many of today's radio communication networks (e.g., LTE Advanced) are based on the notion that there is an imbalance between the DL and UL and, accordingly, separate signaling procedures are used for these two radio links. This approach typically involves high signaling overhead. In future radio communication networks where there exists radio link symmetry between DL and UL, such high signaling overhead may be uncalled for. Or said differently, in radio communication networks where there exists symmetry between DL and UL it may become desirable to reduce signaling overhead.

It is in view of the above realizations and others that the various embodiments disclosed herein have been made.

In one of its aspects, the present disclosure concerns a method performed by a radio network apparatus, or radio network device, for reducing overhead signaling. Radio link quality of a first radio link as well as a second radio link is obtained. For example, the first radio link may be a downlink (DL) and the second radio link may be an uplink (UL). The obtained radio link quality of the first radio link and the second radio link are compared in order to establish whether a similarity in the radio link quality is within a predefined tolerance. Thereby it is made possible to establish whether there exists sufficient radio link similarity between the first radio link and the second radio link. Also, the signaling for both the first radio link and the second radio link is controlled if, or when, the similarity of the radio link quality is within said predefined tolerance. Controlling the signaling may for example comprise controlling one or more of the following: controlling the scheduling of uplink grants, controlling the scheduling of downlink grants, controlling the transmit powers of user equipments, controlling the radio link adaptation.

In one embodiment, obtaining the radio link quality of the first radio link and the second radio link comprises obtaining a first received signal strength (RSS) of the first radio link to determine a first RSS value, and obtaining a second RSS of the second radio link to determine a second RSS value. For example, the comparing of the obtained radio link quality of the first radio link and the second radio link may then comprise calculating an absolute value of the difference between the first RSS value and the second RSS value, and establishing that there exists a similarity in the radio link quality of the first radio link and the second radio link within said predefined tolerance when the calculated absolute value of the difference between the first RSS value and the second RSS value is below or equal to a threshold value.

Prior to obtaining the radio link quality of the first radio link and the second radio link, information on radio link characteristics of the first radio link as well as the second radio link may be gathered, and the gathered radio link characteristics of the first radio link and the second radio link may be compared to establish whether there exists a (sufficient) similarity in the radio link characteristics of the first radio link and the second radio link. In some embodiments, the steps (or actions) of obtaining the radio link quality of a first radio link as well as a second radio link, and comparing the obtained radio link quality of the first radio link and the second radio link to establish whether a similarity of the radio link quality is within a predefined tolerance are performed only in response to that it has been established that there exists a similarity in the radio link characteristics of the first radio link and the second radio link.

According to another aspect, there is provided a radio network apparatus, or radio network device, for reducing overhead signaling. The radio network apparatus may alternatively be referred to as a radio network node. In some embodiments, it may be implemented in a RAN node. In other embodiments, it may be implemented in a CN node. The radio network apparatus comprises means adapted to obtain radio link quality of a first radio link (e.g. DL) as well as a second radio link (e.g. UL), means adapted to compare the obtained radio link quality of the first radio link and the second radio link to establish whether a similarity in the radio link quality is within a predefined tolerance, and means to control the signaling for both the first radio link and the second radio link in response to the similarity of the radio link quality being within said predefined tolerance. The means adapted to control the signaling may comprise means adapted to control the scheduling of uplink grants, means adapted to control the scheduling of downlink grants, means adapted to control transmit powers of user equipments, and/or means adapted to control radio link adaptation.

The radio network apparatus may also comprise means adapted to obtain a first received signal strength (RSS) of the first radio link to determine a first RSS value, and means to obtain a second RSS of the second radio link to determine a second RSS value. The radio network apparatus may also comprise means adapted to calculate an absolute value of the difference between the first RSS value and the second RSS value, and means adapted to establish that there exists a similarity in the radio link quality of the first radio link and the second radio link within said predefined tolerance when the calculated absolute value of the difference between the first RSS value and the second RSS value is below or equal to a threshold value.

Furthermore, the radio network apparatus may comprise means to gather information on radio link characteristics of the first radio link as well as the second radio link, and means to compare the gathered radio link characteristics of the first radio link and the second radio link to establish whether there exists a similarity in the radio link characteristics of the first radio link and the second radio link.

In one example implementation, there is provided a radio network apparatus for reducing overhead signaling. According to this example implementation, the radio network node comprises a controller configured to obtain radio link quality of a first radio link (e.g., DL) as well as a second radio link (e.g., UL), to compare the obtained radio link quality of the first radio link and the second radio link to establish whether a similarity in the radio link quality is within a predefined tolerance and to control the signaling for both the first radio link and the second radio link in response to the similarity of the radio link quality being within said predefined tolerance. The controller may e.g. be configured to control one or more of the following: scheduling of uplink grants, scheduling of downlink grants, transmit powers of user equipments, radio link adaptation.

In one embodiment, the controller is configured to obtain a first received signal strength (RSS) of the first radio link to determine a first RSS value, and to obtain a second RSS of the second radio link to determine a second RSS value.

In one embodiment, the controller is configured to calculate an absolute value of the difference between the first RSS value and the second RSS value and to establish that there exists a similarity in the radio link quality of the first radio link and the second radio link within said predefined tolerance when the calculated absolute value of the difference between the first RSS value and the second RSS value is below or equal to a threshold value.

The radio network apparatus may further comprise at least one transceiver operatively connected to the controller, wherein the at least one transceiver is configured to gather information on radio link characteristics of the first radio link and the second radio link; and wherein the controller is further configured to compare the gathered radio link characteristics of the first radio link and the second radio link to establish whether there exists a similarity in the radio link characteristics of the first radio link and the second radio link.

In another of its aspects, the present disclosure concerns a method performed by radio network control node for reducing overhead signaling. The method comprises obtaining radio link quality of a first radio link as well as a second radio link; comparing the obtained radio link quality of the first radio link and the second radio link to establish whether a similarity in the radio link quality is within a predefined tolerance; and transmitting a message to a radio base station, wherein said message comprises an instruction instructing the radio base station to control the signaling for both the first radio link and the second radio link when the similarity in the radio link quality is within said predefined tolerance.

In one embodiment, obtaining the radio link quality of the first radio link and the second radio link comprises: obtaining a first received signal strength (RSS) of the first radio link to determine a first RSS value; and obtaining a second RSS of the second radio link to determine a second RSS value.

In one embodiment, comparing the obtained radio link quality of the first radio link and the second radio link comprises: calculating an absolute value of the difference between the first RSS value and the second RSS value; and establishing that there exists a similarity in the radio link quality of the first radio link and the second radio link within said predefined tolerance when the calculated absolute value of the difference between the first RSS value and the second RSS value is below or equal to a threshold value.

Prior to obtaining radio link quality of the first radio link and the second radio link, the method may comprise receiving, from a radio base station, information on radio link characteristics of the first radio link as well as the second radio link; and comparing the received radio link characteristics of the first radio link and the second radio link to establish whether there exists a similarity in the radio link characteristics of the first radio link and the second radio link. Prior to receiving (from the radio base station) information on radio link characteristics of the first radio link as well as the second radio link the method may additionally comprise transmitting a message comprising a request to the radio base station requesting the radio base station to perform radio link measurements to establish radio link characteristics of the first radio link as well as the second radio link.

In one embodiment, obtaining the radio link quality of a first radio link as well as a second radio link; and comparing the obtained radio link quality of the first radio link and the second radio link to establish whether a similarity in the radio link quality is within a predefined tolerance are performed only in response to that it has been established that there exists a similarity in the radio link characteristics of the first radio link and the second radio link.

According to one aspect, there is provided a radio network control node for reducing overhead signaling. The radio network control node may be referred to as a Network Management Node (NMN). In UTRAN, the radio network control node may be implemented as a Radio Network Controller (RNC). In E-UTRAN, the radio network control node may be a CN node. For example, the radio network control node may be implemented as a Mobility Management Entity (MME).

The radio network control node comprises means adapted to obtain radio link quality of a first radio link (e.g., DL) as well as a second radio link (e.g., UL), means adapted to compare the obtained radio link quality of the first radio link and the second radio link to establish whether a similarity in the radio link quality is within a predefined tolerance; and means to transmit a message to a radio base station, wherein said message comprises an instruction instructing the radio base station to control the signaling for both the first radio link and the second radio link when the similarity in the radio link quality is within said predefined tolerance.

In one embodiment, the radio network control node comprises means adapted to obtain a first received signal strength (RSS) of the first radio link to determine a first RSS value, and means adapted to obtain a second RSS of the second radio link to determine a second RSS value. Furthermore, the radio network control node may comprise means adapted to calculate an absolute value of the difference between the first RSS value and the second RSS value, and means adapted to establish that there exists a similarity in the radio link quality of the first radio link and the second radio link within said predefined tolerance when the calculated absolute value of the difference between the first RSS value and the second RSS value is below or equal to a threshold value.

Moreover, the radio network control node may comprise means adapted to receive, from a radio base station, information on radio link characteristics of the first radio link as well as the second radio link; and means adapted to compare the received radio link characteristics of the first radio link and the second radio link to establish whether there exists a similarity in the radio link characteristics of the first radio link and the second radio link.

Also, the radio network control node may comprise means adapted to transmit a message comprising a request to the radio base station requesting the radio base station to perform radio link measurements to establish radio link characteristics of the first radio link as well as the second radio link.

In one example implementation, there is provided a radio network control node for reducing overhead signaling. In this example implementation, the radio network control node comprises a processor, a memory and a transmitter, wherein said memory comprises instructions executable by said processor whereby said radio network control node is operative to obtain radio link quality of a first radio link (e.g., DL) as well as a second radio link (e.g., UL) and to compare the obtained radio link quality of the first radio link and the second radio link to establish whether a similarity in the radio link quality is within a predefined tolerance, and wherein the transmitter is configured to, in response to the similarity in the radio link quality being within said predefined tolerance, transmit a message to a radio base station. Said message comprises an instruction instructing the radio base station to control the signaling for both the first radio link and the second radio link.

In one embodiment, said memory comprises instructions executable by said processor whereby said radio network control node is operative to obtain a first received signal strength (RSS) of the first radio link to determine a first RSS value, and to obtain a second RSS of the second radio link to determine a second RSS value.

In one embodiment, said memory comprises instructions executable by said processor whereby said radio network control node is operative to calculate an absolute value of the difference between the first RSS value and the second RSS value and to establish that there exists a similarity in the radio link quality of the first radio link and the second radio link within said predefined tolerance when the calculated absolute value of the difference between the first RSS value and the second RSS value is below or equal to a threshold value.

The radio network control node may further comprise a receiver configured to receive (from the radio base station) information on radio link characteristics of the first radio link as well as the second radio link. Said memory may comprise instructions executable by said processor whereby said radio network control node is operative to compare the received radio link characteristics of the first radio link and the second radio link to establish whether there exists a similarity in the radio link characteristics of the first radio link and the second radio link.

The radio network control node may also comprise a transmitter configured to transmit a message comprising a request to the radio base station requesting the radio base station to perform radio link measurements to establish radio link characteristics of the first radio link as well as the second radio link.

In another of its aspects, the present disclosure concerns a method performed by a radio base station for reducing overhead signaling. The method comprises performing radio link measurements to establish radio link characteristics of a first radio link (e.g., DL) as well as a second radio link (e.g., UL), and transmitting, to a radio network control node, information on radio link characteristics of the first radio link as well as the second radio link.

Prior to performing the radio link measurements to establish radio link characteristics of the first radio link as well as the second radio link, the method may comprise receiving (from the radio network control node) a message comprising a request requesting the radio base station to perform radio link measurements to establish radio link characteristics of the first radio link as well as the second radio link.

According to a one aspect, there is provided a radio base station for reducing overhead signaling. The radio base station may be referred to as a base station. For example, the radio base station may be implemented as a RAN node. In UTRAN, the radio base station may be implemented as a NodeB (NB). In E-UTRAN, the radio base station may be implemented as an evolved NodeB (eNB).

The radio base station comprises means adapted to perform radio link measurements to establish radio link characteristics of a first radio link (e.g., DL) as well as a second radio link (e.g., UL), and means adapted to transmit (to a radio network control node) information on radio link characteristics of the first radio link as well as the second radio link. The radio base station may also comprise means adapted to receive (from the radio network control node) a message comprising a request requesting the radio base station to perform radio link measurements to establish radio link characteristics of the first radio link as well as the second radio link.

In one example implementation, there is provided a radio base station for reducing overhead signaling. In this example implementation, the radio base station comprises a processor and a memory, wherein said memory comprises instructions executable by said processor whereby said radio base station is operative to perform radio link measurements to establish radio link characteristics of a first radio link as well as a second radio link. The radio base station additionally comprises a transmitter configured to transmit (to the radio network control node) information on radio link characteristics of the first radio link as well as the second radio link. The radio base station may further comprise a receiver configured to receive (from the radio network control node) a message comprising a request requesting the radio base station to perform radio link measurements to establish radio link characteristics of the first radio link as well as the second radio link.

As used herein, obtaining a RSS may comprise obtaining a received signal strength indicator (RSSI). Thus, obtaining the radio link quality of the first radio link and the second radio link may comprise obtaining a first RSSI of the first radio link to determine a first RSSI value, and obtaining a second RSSI of the second radio link to determine a second RSSI value. For example, the comparing of the obtained radio link quality of the first radio link and the second radio link may then comprise calculating an absolute value of the difference between the first RSSI value and the second RSSI value, and establishing that there exists a similarity in the radio link quality of the first radio link and the second radio link within said predefined tolerance when the calculated absolute value of the difference between the first RSSI value and the second RSSI value is below or equal to a threshold value.

The various embodiments described hereinabove allow for reducing any overhead signaling. By controlling the signaling for the first radio link (e.g. DL) as well as the second radio link (UL) when it has been determined that there exists sufficient similarity, or symmetry, of the radio link quality of the two radio links means that otherwise potentially unnecessary overhead signaling can be avoided, or at least reduced. This may become particularly advantageous in future communication networks where it is foreseen that there will exist similarities in radio link quality between UL and DL in many scenarios.

BRIEF DESCRIPTION OF THE DRAWINGS

These and other aspects, features and advantages will be apparent and elucidated from the following description of various embodiments, reference being made to the accompanying drawings, in which.

DETAILED DESCRIPTION

The invention will now be described more fully hereinafter with reference to the accompanying drawings, in which certain embodiments are shown. The invention may, however, be embodied in many different forms and should not be construed as limited to the embodiments set forth herein; rather, these embodiments are provided by way of example so that this disclosure will be thorough and complete, and will fully convey the scope of the technology to those persons skilled in the art. Like reference numbers refer to like elements or method steps throughout the description.

Figure 1:
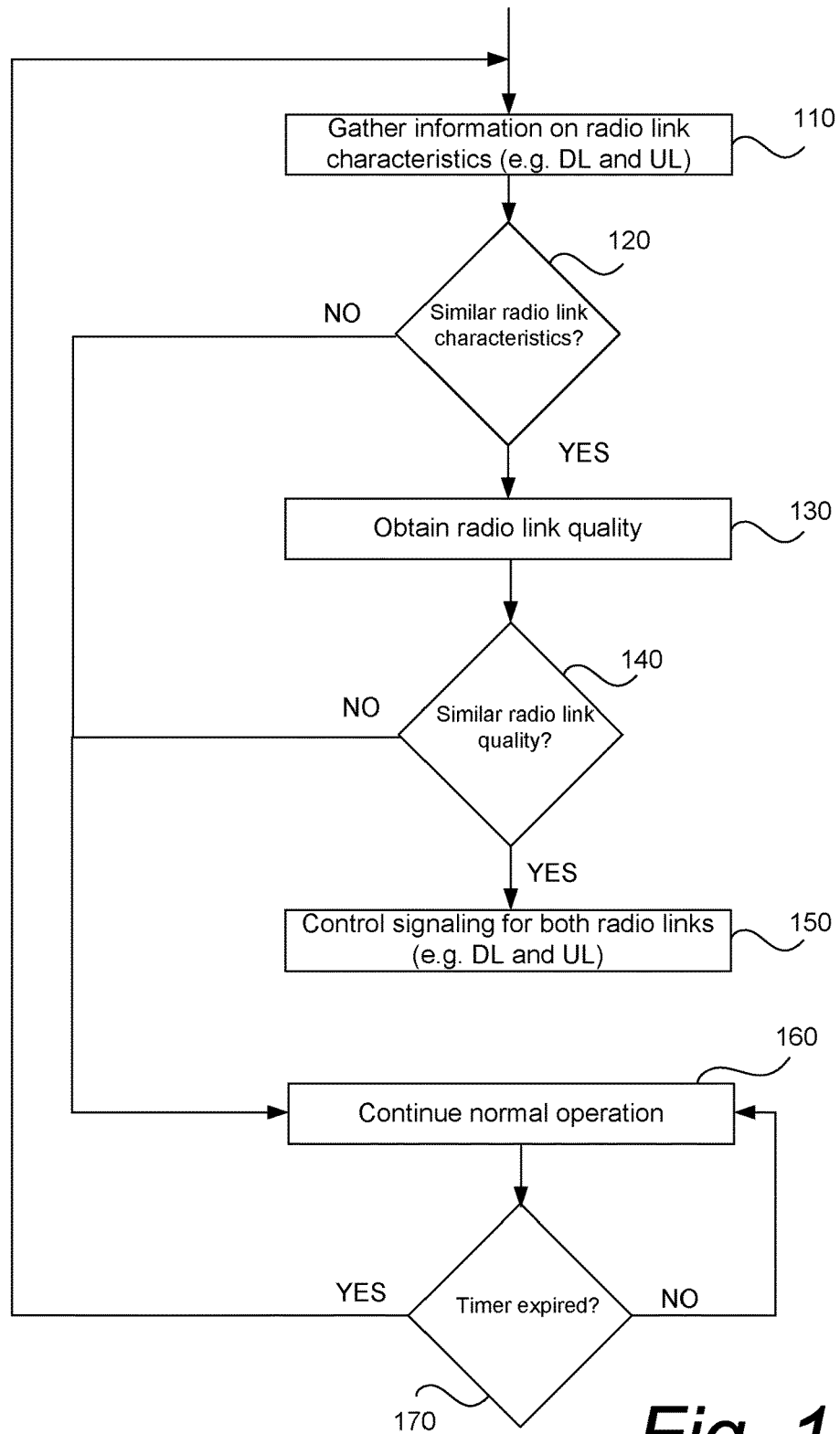
FIGS. 1-3 are flowcharts illustrating various embodiments of method steps.

A method aimed at reducing overhead signaling is proposed herein. With reference to FIG. 1, the radio link quality of a first radio link (e.g., DL) as well as a second radio link (e.g., UL) is obtained 130. Also, the obtained radio link quality of the first radio link is compared 140 with the obtained radio link quality of the second radio link. This is done in order to establish whether a similarity in the radio link quality is within a predefined tolerance. That is, the comparison of the radio link quality of the first and second radio links, respectively, is done in order to establish whether the radio link similarity is sufficient. The predefined tolerance, or tolerance value, should preferably be tested and evaluated for each specific case. As such, the exact tolerance level may be predefined in dependence of e.g. operator needs, end-user demands, system level requirements for the radio communication network to be operated, etcetera. Next, the signaling for both the first radio link and the second radio link is controlled 150 if, or when, the similarity of the radio link quality is determined to be within said predefined tolerance. For example, one or more of the following can be controlled 150: scheduling of uplink grants, scheduling of downlink grants, transmit powers of user equipments, radio link adaptation.

Figure 2:
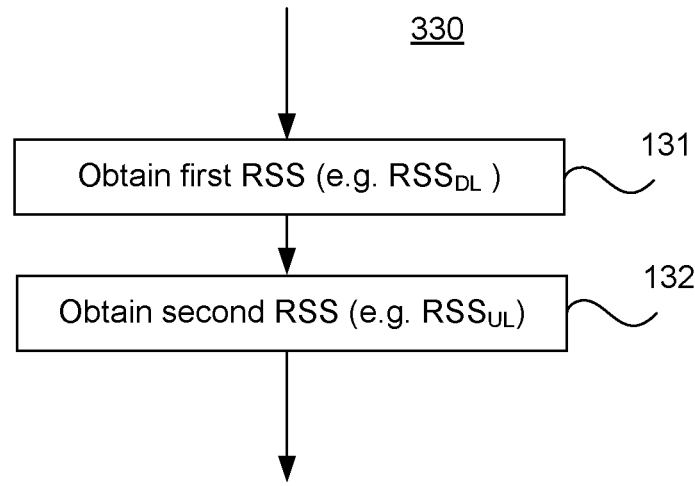
Figure 3:
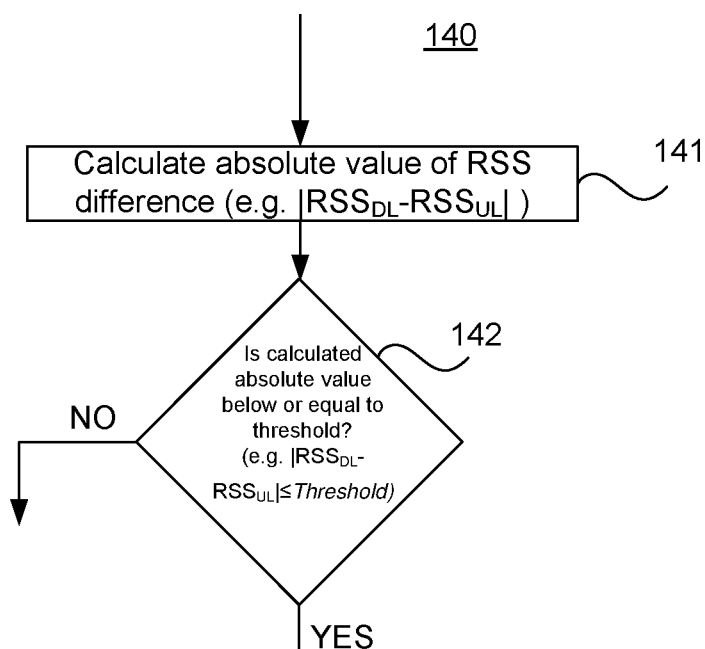

With reference to FIG. 2, it should be appreciated that obtaining 130 the radio link quality of the first radio link and the second radio link may, for example, comprise obtaining 131 a first received signal strength (RSS) of the first radio link to determine a first RSS value, and obtaining 132 a second RSS of the second radio link to determine a second RSS value. With further reference to FIG. 3, it can be appreciated that comparing 140 the obtained radio link quality of the first radio link and the second radio link may comprise calculating 141 an absolute value of the difference between the first RSS value and the second RSS value (e.g., $|RSS_{DL}-RSS_{UL}|$), and establishing 142 that there exists a similarity in the radio link quality of the first radio link and the second radio link within said predefined tolerance when the calculated absolute value of the difference between the first RSS value and the second RSS value is below or equal to a threshold value (e.g., $|RSS_{DL}-RSS_{UL}| \leq$Threshold).

Returning now to FIG. 1, the method may optionally comprise, prior to obtaining 130 the radio link quality of the first radio link and the second radio link, gathering 110 information on radio link characteristics of the first radio link as well as the second radio link, and comparing 120 the gathered radio link characteristics of the first radio link and the second radio link to establish whether there exists a similarity in the radio link characteristics of the first radio link and the second radio link. In some embodiments, the step, or action, of obtaining 130 the radio link quality of the first radio link and the second radio link is made conditional on steps 110 and 120. That is, the step or action of obtaining 130 the radio link quality of the first radio link and the second radio link is only performed in response to that it has first been established that there exists a similarity in the radio link characteristics of the first radio link and the second radio link.

Consequently, it can be determined if there exists sufficient radio link similarity, or radio link symmetry, between two radio links (e.g. DL and UL) and if there does exist sufficient radio link similarity between the two radio links the signaling of both radio links can be controlled. It is thus made possible to optimize, or improve, the signaling of both radio links when the two radio links have similar radio link properties. By optimizing, or improving, the signaling of both radio links taking due account of the fact that both radio links exhibit similar radio link properties it is thus also possible to avoid, or reduce, unnecessary overhead signaling in those scenarios where the radio links have similar radio link radio link properties. Thus, the proposed method is believed to be advantageous in future generations of radio communication networks where it is, e.g., anticipated that DL and UL will often, or relatively often, exhibit radio link similarity. An example of such future generation radio communication network is Ultra Dense Networks (UDN).

Figure 4:
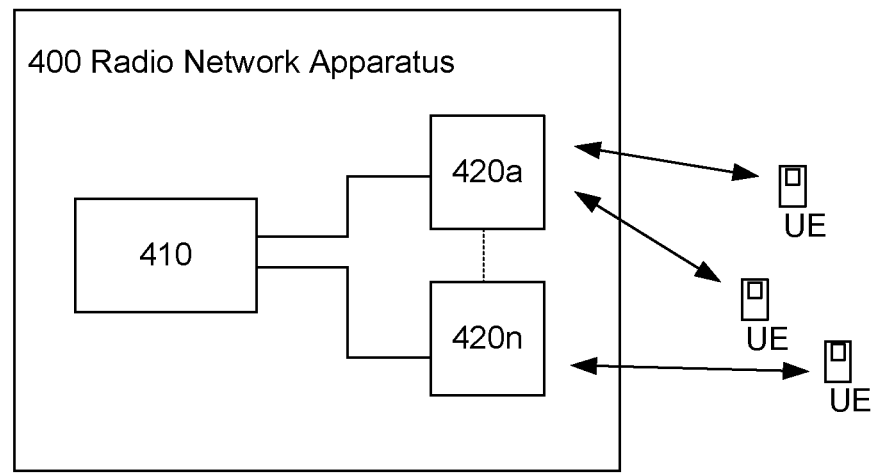
FIG. 4 illustrates an embodiment of a radio network apparatus.
Figure 5:
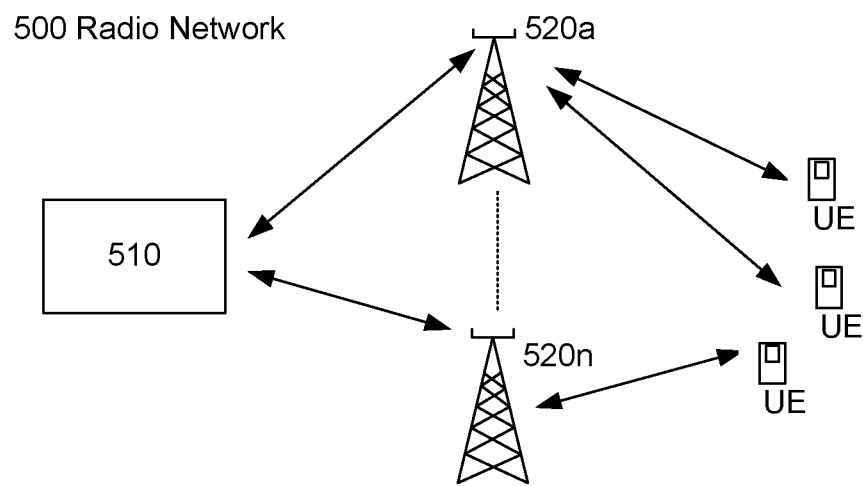
FIG. 5 illustrates a radio communication network involving a radio network control node and one or more radio base stations.

The method described with reference to FIGS. 1-3 can be implemented in various ways. FIG. 4 illustrates one embodiment where the method is performed, or otherwise implemented in, a radio network apparatus 400 of a radio communication network. FIG. 5 illustrates another embodiment where the method is performed in a distributed manner in a radio communication network involving a radio network control node 510 and one or more radio base stations 520a-n. The different embodiments will be further discussed in the following:

With reference to FIG. 4, an example embodiment of a radio network apparatus 400 is provided. In this example implementation, the radio network apparatus comprises a controller 410 and one or more transceivers 420. The one or more transceivers 420 may alternatively be implemented as separate transmitters and receivers, respectively. The controller 410 is configured to obtain radio link quality of a first radio link (e.g., DL) as well as a second radio link (e.g., UL), to compare the obtained radio link quality of the first radio link and the second radio link to establish whether a similarity in the radio link quality is within a predefined tolerance and to control the signaling for both the first radio link and the second radio link in response to the similarity of the radio link quality being within said predefined tolerance. For instance, the controller 410 may be configured to control one or more of the following: scheduling of uplink grants, scheduling of downlink grants, transmit powers of user equipments, radio link adaptation, etcetera.

Advantageously, the controller 410 is configured to obtain a first RSS of the first radio link to determine a first RSS value, and to obtain a second RSS of the second radio link to determine a second RSS value. Also, the controller 410 is advantageously configured to calculate an absolute value of the difference between the first RSS value and the second RSS value (e.g., $|RSS_{DL}-RSS_{UL}|$) and to establish that there exists a similarity in the radio link quality of the first radio link and the second radio link within said predefined tolerance when the calculated absolute value of the difference between the first RSS value and the second RSS value is below or equal to a threshold value (e.g., $|RSS_{DL}-RSS_{UL}| \leq$Threshold).

In the illustrated example embodiment, the radio network apparatus 400 comprises one or several transceivers 420a-n, each of which are operatively connected to the controller 410. The transceivers 420a-n are configured to gather information on radio link characteristics of the first radio link and the second radio link, respectively. For example, the transceiver 420a-n may be configured to receive messages from the UE wherein said messages include reports on radio link measurements typically performed by the respective UEs. These reports may e.g. include information such as Channel Quality Indicators and other Channel State Information. As will be further explained later herein, these reports may also comprise other information related to radio link characteristics of the first and second link, respectively, such as: Transmission Power Levels, Antenna Heights, Link Capabilities, Frequency, Average Energy Levels, etc. Also, the controller 410 is further configured to compare the gathered radio link characteristics of the first radio link and the second radio link to establish whether there exists a similarity in the radio link characteristics of the first radio link and the second radio link.

Figure 6:
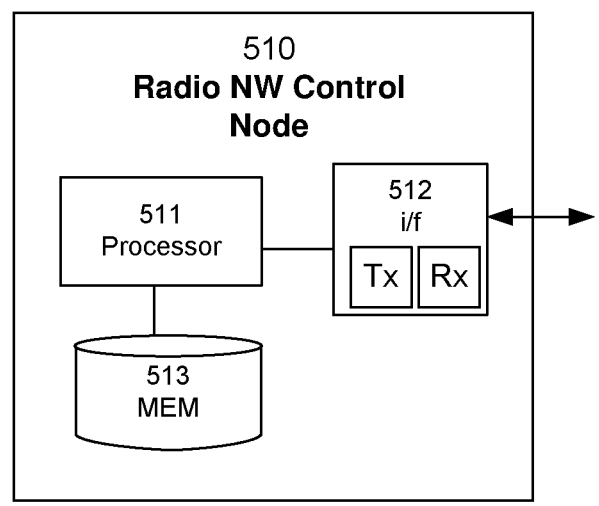
FIG. 6 illustrates an embodiment of a radio network control node.
Figure 7:
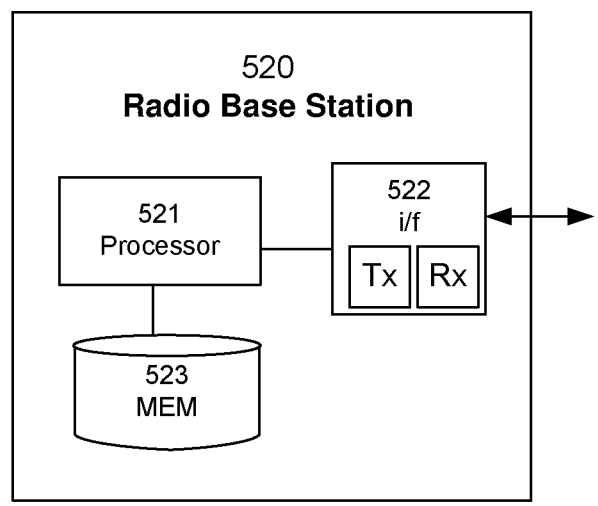
FIG. 7 illustrates an embodiment of a radio base station.

Turning now to FIGS. 5, 6 and 7, another embodiment will be described. This embodiment suggests a distributed approach. As can be seen in FIG. 5, a radio communication network 500 may comprise a radio network control node 510 and one or more radio base stations 520a-n.

The radio network control node 510, which may alternatively be referred to as a Management Node or Network Management Node, is suitable for reducing overhead signaling. As can be seen in FIG. 6, the radio network control node 510 may comprise a processor 511, a memory 513 and a transmitter (Tx) 512. The network control node 510 may also comprise a receiver (Rx) 512. In some embodiments, a single transceiver (Tx/Rx) 512 is provided instead of separate transmitters and receivers. The memory 513 comprises instructions executable by the processor 511 whereby the processor 511 is operative to obtain radio link quality of a first radio link (e.g. DL) as well as a second radio link (e.g. UL) and to compare the obtained radio link quality of the first radio link and the second radio link to establish whether a similarity in the radio link quality is within a predefined tolerance. Furthermore, the transmitter 512 is configured to, in response to the similarity in the radio link quality being within said predefined tolerance, transmit a message to a radio base station 520a-520n. The message comprises an instruction instructing the radio base station to control the signaling for both the first radio link and the second radio link.

The memory 513 may also comprise instructions executable by the processor 511 whereby the processor 511 is operative to obtain a first RSS of the first radio link to determine a first RSS value and to obtain a second RSS of the second radio link to determine a second RSS value. Yet further, the memory 513 may comprise instructions executable by the processor 511 whereby the processor 511 is operative to calculate an absolute value of the difference between the first RSS value and the second RSS value (e.g., $|RSS_{DL}-RSS_{UL}|$) and to establish that there exists a similarity in the radio link quality of the first radio link and the second radio link within said predefined tolerance when the calculated absolute value of the difference between the first RSS value and the second RSS value is below or equal to a threshold value (e.g., $|RSS_{DL}-RSS_{UL}| \leq Threshold$).

In some embodiments, a receiver 512 is configured to receive, from the radio base station 520a-520n, a message including information on radio link characteristics of the first radio link as well as the second radio link. The memory 513 may comprise instructions executable by the processor 511 whereby the processor 511 is operative to compare the received radio link characteristics of the first radio link and the second radio link to establish whether there exists a similarity in the radio link characteristics of the first radio link and the second radio link.

In some embodiments, a transmitter 512 is configured to transmit a message comprising a request to the radio base station 520a-n for requesting the radio base station to perform radio link measurements to establish radio link characteristics of the first radio link as well as the second radio link.

A radio base station denoted 520a-n is communicatively connectable to the radio network control node 510. The radio base station 520, which may in some embodiments be implemented in an eNB, typically comprises a processor 521, a memory 523 and a transmitter (Tx) 522. The radio base station may also comprise a receiver (Rx) 522. In some embodiments, the transceiver (Tx) and the receiver (Rx) are combined into a single transceiver (Tx/Rx) 522. The memory 523 comprises instructions executable by the processor 521 whereby the radio base station 521 is operative to perform radio link measurements in order to establish radio link characteristics of a first radio link as well as a second radio link. Some of the performed radio link measurements may include (and thus be complemented by) information gathered, or otherwise collected, from the UEs that are in communication with the radio base station 520. For example, a receiver 521 may be configured to receive messages from the UE wherein said messages include reports on radio link measurements that could be performed by the respective UEs. These reports may e.g. include information such as Channel Quality Indicators and other Channel State Information. These reports may also comprise other information related to radio link characteristics of the first and second link, respectively, such as: Transmission Power Levels, Antenna Heights, Link Capabilities, Frequency, Average Energy Levels, etc. The radio base station 520 further comprises a transmitter 522 which is configured to transmit, to the radio network control node 510, information on radio link characteristics of the first radio link as well as the second radio link. In some embodiments, the receiver 522 is configured to receive, from the radio network control node 510, a message comprising a request requesting the radio base station 520 to perform radio link measurements to establish radio link characteristics of the first radio link as well as the second radio link.

Radio Link Characteristics

As described earlier, embodiments disclosed herein may optionally comprise gathering information on radio link characteristics of the first radio link (e.g. DL) as well as the second radio link (e.g. UL). This gathered information may subsequently be used to establish whether there exists a similarity in the radio link characteristics of the first radio link and the second radio link, respectively (see FIG. 1). In the following, several conceivable parameters, or indications, will be discussed:

a. Transmission Power

Information on radio link characteristics may comprise transmission power levels. For example, the maximum possible transmission power levels TxPwMax of different communication devices may be compared. In some embodiments, the difference between two communication devices are compared:

$$|TxPwMax_1 - TxPwMax_2| \leq Threshold\_Power$$

If the difference of the maximum possible transmission power levels between the two communication devices is equal to or below a certain threshold value, this may be an indication that the two communication devices have similar potential in terms of the transmission power.

In the current 3GPP LTE Release 11 all UE categories typically have the same maximum output power of 23 dBm for a number of supported bands as can be seen in e.g. § 6.2.2 of 3GPP TS 36.104 version 11.2.0. There are discussions in 3GPP regarding the introduction of higher power UEs. Very probably proposals on lower transmission power UEs can be seen in Release 12 in the context of Machine Type Communications (MTC). In case of UEs with maximum transmission power levels, it is likely that such information will be included either in the ue-category field of the UECapabilityInformation IE and namely in the UECapabilityRAT-ContainerList of 3GPP TS 36.331 version 11.1.0. In other words, the communication devices (e.g. UEs, radio base stations, radio network control nodes, radio network apparatuses) may be configured to signal (i.e. transmit and/or receive) messages including this information. For example, the message may be a data message having one or several data fields, where at least one data field includes or otherwise indicates TxPwMax of a communication device.

b. Antenna Height

Information on radio link characteristics may additionally, or alternatively, comprise antenna heights. For example, the antenna heights AntennaHeight of different communication devices may be compared:

$$|AntennaHeight_1 - AntennaHeight_2| \leq Threshold\_AntennaHeight$$

If the difference of the antenna heights between the two communication devices is equal to or below a certain threshold value, this may be an indication that the two communication devices have similar antenna heights and, thus, similar radio link characteristics.

The antenna height of a network node, e.g. a base station, is generally known e.g. to the network operator. It is also possible to estimate the antenna height of a terminal such as UE e.g. by combining received signal strength and other positioning information. In some cases, estimation of the UE position might be added too in order to improve the estimation. The communication devices (e.g. UEs, radio base stations, radio network control nodes, radio network apparatuses) may be configured to signal (i.e. transmit and/or receive) messages including this information. For example, the message may be a data message having one or several data fields, where at least one data field includes or otherwise indicates AntennaHeight of a communication device.

c. Link Capabilities

Information on radio link characteristics may additionally, or alternatively, comprise radio link capabilities. For example, the radio link capabilities LinkCap of different communication devices may be compared:

$$|LinkCap_1 - LinkCap_2| \leq Threshold\_LinkCap$$

If the difference of the radio link capabilities between the two communication devices is equal to or below a certain threshold value, this may be an indication that the two communication devices have similar radio link capabilities and, thus, similar radio link characteristics.

Link capabilities of a given communication device (e.g. UE, radio base station, radio network control node, radio network apparatus) related to the radio link budget may be affected by the antenna gain, the tower mounted amplifier (TMA) gain (if TMA exists), the noise figure, NF, the feeder losses (if feeder exists) and additional processing capabilities such as receiver, i.e. interference cancellation/suppression or rejection and the maximum possible interference suppression level. In other words, link capabilities may be characterized as:

$$LinkCap = \alpha \cdot AntennaGain + \beta \cdot TMA\_Gain + \gamma \cdot NF + \delta \cdot FeederLoss + \varepsilon \cdot ProcCap$$

Where $\alpha$, $\beta$, $\gamma$, $\delta$ and $\varepsilon$ are weighting factors which can take values between 0 and 1.

The communication devices (e.g. UEs, radio base stations, radio network control nodes, radio network apparatuses) may be configured to signal (i.e. transmit and/or receive) messages including this information. For example, the message may be a data message having one or several data fields, where at least one data field includes or otherwise indicates LinkCap of a communication device.

d. Frequency

Information on radio link characteristics may additionally, or alternatively, comprise frequency. For example, the frequency in UL and DL bands may be compared:

$$|Frequency_{UL} - Frequency_{DL}| \leq Threshold\_Frequency$$

If the difference of the frequency between the UL and DL, respectively, is equal to or below a certain threshold value, this may be an indication that there exists similar radio link characteristics.

In some embodiments, the threshold of difference in frequencies can be set according to the frequency selectivity of the channel. If this threshold is comparable to the coherence bandwidth of the radio channel in discussion here, then, in case the formula hereinabove is satisfied, then, it could be assumed that the UL and DL are perceiving similar multipath propagation profile. It is readily understood that the formula hereinabove is always satisfied for TDD systems.

e. Energy or Traffic

Information on radio link characteristics may additionally, or alternatively, comprise energy. An indication of possible UL-DL radio link symmetry may be the observed transmitted power levels of the communicating devices within a given time period, T. In order for the comparison to be fair, the two communicating devices should transmit similar amounts of traffic, or equivalently being active during similar or equivalent activity periods.

Hence, in case the average energy levels, EnergyAvg, differ less than a threshold, Threshold_Energy, e.g.:

$$|EnergyAvg_1 - EnergyAvg_2| \leq Threshold\_Energy$$

If the amount of traffic transmitted by the communicating devices during this observation period, T, is similar; i.e. if the difference in transmitted traffic, TxTraffic, of the communicating devices is less than a threshold, Threshold_Tx-Traffic, e.g.

$$|TxTraffic_1 - TxTraffic_2| \leq Threshold\_TxTraffic$$

then this may also be a sufficient indication of similar radio link characteristics.

The communication devices (e.g. UEs, radio base stations, radio network control nodes, radio network apparatuses) may be configured to signal (i.e. transmit and/or receive) messages including this information. For example, the message may be a data message having one or several data fields, where at least one data field includes or otherwise indicates EnergyAvg and/or TxTraffic of a communication device.

One or several of the above-mentioned parameters or indications a-e may be used. Additionally, or alternatively it may also be conceivable that, in case multi-layer transmission is supported, the number of effective antennas at the different communicating devices can be checked as well. If the number of effective antennas is the same, then, this is also an indication of similar radio link characteristics. It is noted here that the number of effective antennas is directly related to the number of streams.

In some embodiments, several of the indications a-e are used. In such embodiments, it may be decided that a certain number N of indications has to be fulfilled in order to determine that there is sufficient similarity in the radio link characteristics. Turning back to FIG. 3, it may e.g. be decided that method step, or action, 130 is only performed if N (e.g. 2) of the 6 indications a-e described hereinabove are fulfilled.

The various embodiments described hereinabove may provide for an overhead signaling reduction, or improvement. By controlling the signaling for the first radio link (e.g. DL) as well as the second radio link (UL) when it has been determined that there exists sufficient similarity, or symmetry, of the radio link quality of the two radio links means that otherwise needed (i.e. when no such symmetry exists) but now potentially unnecessary overhead signaling can be avoided, or at least reduced. This may become particularly advantageous in future communication networks where it is foreseen that there will exist similarities in radio link quality between UL and DL in many scenarios.

In the detailed description hereinabove, for purposes of explanation and not limitation, specific details are set forth such as particular architectures, interfaces, techniques, etc. in order to provide a thorough understanding of various embodiments. In some instances, detailed descriptions of well-known devices, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated by those skilled in the art that block diagrams herein can represent conceptual views of illustrative circuitry or other functional units embodying the principles of the embodiments. Similarly, it will be appreciated that any flow charts and the like represent various processes which may be substantially represented in computer readable medium and so executed by a computer or processor, whether or not such computer or processor is explicitly shown. The functions of the various elements, including functional blocks, may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Modifications and other variants of the described embodiments will come to mind to one skilled in the art having benefit of the teachings presented in the foregoing description and associated drawings. Therefore, it is to be understood that the embodiments are not limited to the specific example embodiments disclosed and that modifications and other variants are intended to be included within the scope of this disclosure. Although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. Also, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims. In addition, singular references do not exclude a plurality. Finally, reference signs in the claims are provided merely as a clarifying example and should not be construed as limiting the scope of the claims in any way.

The invention claimed is:

1. A method performed by a radio network apparatus operating in a radio communication network, the method comprising:

gathering information on radio link characteristics of a first radio link and information on radio link characteristics of a second radio link, the first radio link being a downlink for a first User Equipment (UE) operating in the radio communication network and the second radio link being an uplink for a second UE operating in the radio communication network, wherein the information on the radio link characteristics of the first radio link and the information on the radio link characteristics of the second radio link include at least antenna height information for the first UE and the second UE, respectively;

comparing the gathered information on the radio link characteristics of the first radio link and the gathered information on the radio link characteristics of the second radio link to establish whether a similarity exists between the radio link characteristics of the first radio link and the second radio link; and in response to establishing that there is a similarity between the radio link characteristics of the first radio link and the second radio link:

obtaining radio link quality of the first radio link and radio link quality of the second radio link;

comparing the obtained radio link quality of the first radio link and the obtained radio link quality of the second radio link to establish whether a similarity between the radio link qualities is within a predefined tolerance; and in response to establishing that a similarity of the radio link qualities is within said predefined tolerance, controlling signaling for both the first radio link and the second radio link to reduce overhead signaling.

2. The method according to claim 1, wherein obtaining the radio link quality of the first radio link and the radio link quality of the second radio link comprises:

obtaining a first received signal strength (RSS) of the first radio link to determine a first RSS value; and obtaining a second RSS of the second radio link to determine a second RSS value.

3. The method according to claim 2, wherein comparing the obtained radio link quality of the first radio link and the obtained radio link quality of the second radio link comprises:

calculating an absolute value of a difference between the first RSS value and the second RSS value; and establishing that the similarity between the radio link qualities of the first radio link and the second radio link exists within said predefined tolerance when the calculated absolute value of the difference between the first RSS value and the second RSS value is below or equal to a threshold value.

4. The method according to claim 1, wherein controlling the signaling comprises controlling one or more of the following to reduce the overhead signaling: scheduling of uplink grants, scheduling of downlink grants, transmit powers, or radio link adaptation.

5. A radio network apparatus configured for operation in a radio communication network, the radio network apparatus comprising:

at least one transceiver configured to transmit and receive radio signals and configured to gather information on radio link characteristics of a first radio link and information on radio link characteristics of a second radio link, wherein the first radio link is a downlink for a first User Equipment (UE) operating in the radio communication network and the second radio link is an uplink for a second UE operating in the radio communication network, and wherein the information on the radio link characteristics of the first radio link and the information on the radio link characteristics of the second radio link include at least antenna height information for the first UE and the second UE, respectively; and a processing circuit configured to:
compare the gathered information on the radio link characteristics of the first radio link and the gathered information on the radio link characteristics of the second radio link to establish whether a similarity exists between the radio link characteristics of the first radio link and the second radio link; and in response to establishing that a similarity between the radio link characteristics of the first radio link and the second radio link exists:
obtain radio link quality of the first radio link and radio link quality of the second radio link;
compare the obtained radio link quality of the first radio link and the obtained radio link quality of the second radio link to establish whether a similarity between the radio link qualities is within a predefined tolerance; and
in response to establishing that a similarity of the radio link qualities is within said predefined tolerance, control signaling for both the first radio link and the second radio link to reduce overhead signaling.

6. The radio network apparatus according to claim 5, wherein the processing circuit is further configured to:
obtain a first received signal strength (RSS) of the first radio link to determine a first RSS value; and
obtain a second RSS of the second radio link to determine a second RSS value.

7. The radio network apparatus according to claim 6, wherein the processing circuit is further configured to:
calculate an absolute value of a difference between the first RSS value and the second RSS value; and
establish that the similarity in the radio link quality of the first radio link and the second radio link exists within said predefined tolerance when the calculated absolute value of the difference between the first RSS value and the second RSS value is below or equal to a threshold value.

8. The radio network apparatus according to claim 5, wherein the processing circuit is configured to control one or more of the following to reduce the overhead signaling: scheduling of uplink grants, scheduling of downlink grants, transmit powers, or radio link adaptation.

* * * * *